United States Patent [19]

Oka

[11] Patent Number: 4,539,702

[45] Date of Patent: Sep. 3, 1985

[54] BILL DISCRIMINATING METHOD

[75] Inventor: Yoshinobu Oka, Tokyo, Japan

[73] Assignee: Laurel Bank Machine Co., Ltd., Tokyo, Japan

[21] Appl. No.: 568,715

[22] Filed: Jan. 6, 1984

[30] Foreign Application Priority Data

Jan. 8, 1983 [JP] Japan .................................... 58-1458

[51] Int. Cl.$^3$ ............................................... G06K 9/64

[52] U.S. Cl. ........................................ 382/7; 209/534; 356/71

[58] Field of Search .............. 382/7; 209/534; 356/71; 250/556, 557, 559; 194/4 R

[56] References Cited

U.S. PATENT DOCUMENTS 3,718,823 2/1973 Niikura et al. ...................... 209/534

4,041,456 8/1977 Ott et al. ................................ 382/7

4,179,685 12/1979 O'Maley ................................ 382/7

4,356,476 10/1982 Freudenthal ........................... 382/7

*Primary Examiner*—Leo H. Boudreau

*Assistant Examiner*—Joseph Mancuso

*Attorney, Agent, or Firm*—Fleit, Jacobson, Cohn & Price

[57] ABSTRACT

A discriminating method, wherein a bill pattern is extracted in accordance with signals derived from selected optimum channels out of a plurality of channels connected to sensors disposed in the path across which a bill moves and the bill is discriminated through comparing the bill pattern with a reference pattern set up previously in accordance with the discriminating operational modes and the kind of bill. Bill discriminating units are provided, each having a RAM and a multiplexer. The RAM permits writing of any desired reference pattern therein, while the multiplexer selects any desired channels. Because of this arrangement, it is possible to discriminate bills for different operational modes and different kinds of bills.

1 Claim, 6 Drawing Figures

BILL DISCRIMINATING METHOD

BACKGROUND OF THE INVENTION

The present invention relates to a method of discriminating a bill or bank note as to whether the bill is placed with its obverse side directed upwardly or downwardly and whether the bill is damaged or not, as well as the kind of the bill.

A known system for discriminating a bill has n sensors (n being 1 or an integer greater than 1) disposed across the path of travel of the bill, and n channels for transmitting output signals from the sensors. In operation, several optimum channels which provide the most effective information corresponding to the operation mode and kind of bill are selected, and a bill pattern is obtained in accordance with the output signals from the optimum channels. Then, a comparison is made between the bill pattern thus obtained and reference patterns which are previously set up in accordance with the operation modes and the kind of the bill to discriminate the bill. For instance, in the case where a 10,000 bill is discriminated in the bill kind discrimination mode, one, two or more optimum channels which most distinctively provide the features of this bill are selected, and then a bill pattern is obtained in accordance with the output signals from these channels. This bill pattern is then compared with preset reference patterns to discriminate the bill.

In the conventional bill discriminating system, it is necessary to prepare a multiplicity of bill discriminating units having different reference patterns and adapted to be connected to different channels, corresponding to conbinations of the respective operational modes and the respective kinds of bills. Therefore, it is necessary to replace or change-over these bill judging units. Consequently, the bill discriminating system is expensive and uneconomical to maintain.

SUMMARY OF THE INVENTION

It is, therefore, one object of the present invention to provide an economical bill discriminating method having wide adaptability. To this end, according to the invention, a RAM (Random Access Memory) and a channel selecting means (e.g. multiplexer) are provided in each bill discriminating unit. The RAM is constructed to permit writing of any desired reference pattern therein, while the channel selecting means is adapted to select any desired channels. According to this arrangement, it is possible to discriminate bills for different operational modes and different kinds of bills.

DETAILED DESCRIPTION OF THE PREFERRED EMBODIMENT

A preferred embodiment of the invention will be described hereinunder with reference to the accompanying drawings.

Figure 1:
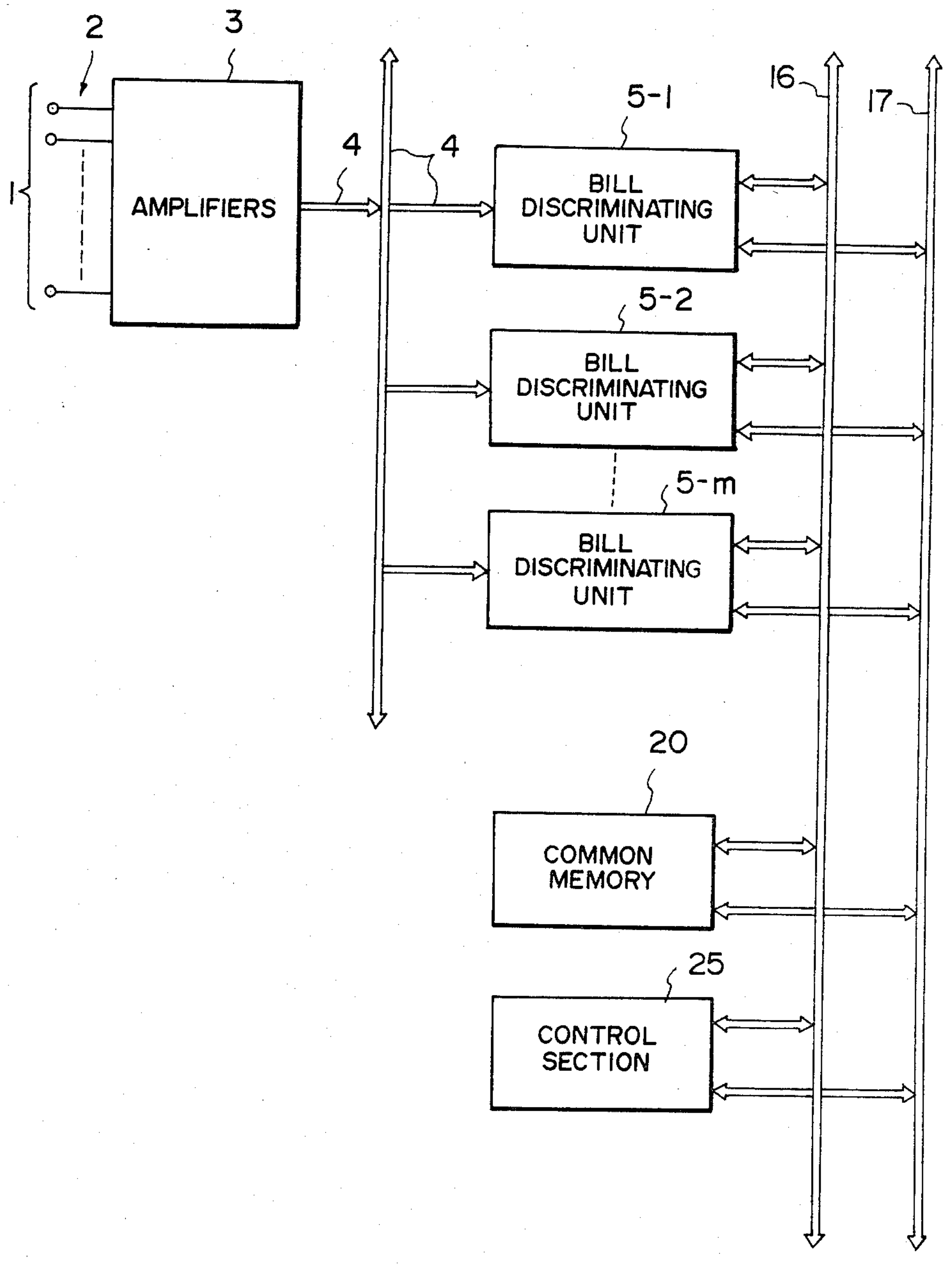
FIG. 1 is a block diagram of an embodiment of the invention.
Figure 2:
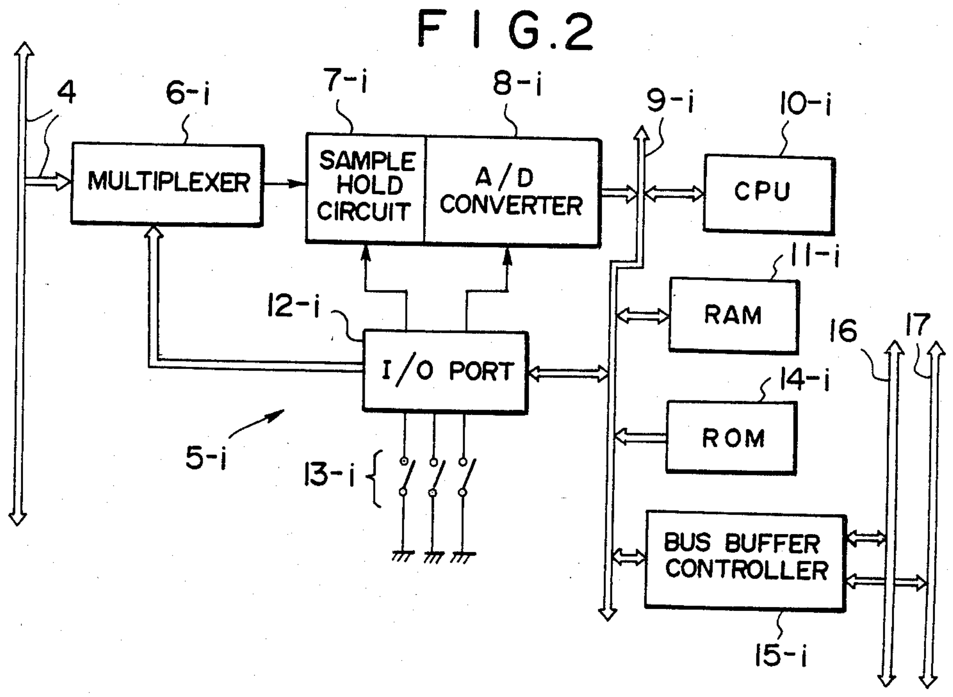
FIG. 2 is a block diagram of a bill discriminating unit incorporated in the embodiment shown in FIG. 1.

FIG. 1 is a block diagram of an embodiment of the present invention. In this Figure, n sensors are arranged across the path of bills so as to detect the bill patterns. The output signals from these sensors 1 are delivered to the input terminals of bill discriminating units 5–1, 5–2, . . . 5-m through channels 2, amplifiers 3 and channels 4. The bill discriminating units 5-i (i being 1,2. . .m)have an identical construction which is shown by a block diagram in FIG. 2. In FIG. 2, a multiplexer 6-i is adapted to select one or more optimum channels out of the channels 4 and delivers the outputs from the selected channels to a sample hold circuit 7-i. The sample hold circuit 7-i is adapted to sample and hold the signals delivered thereto and deliver the same to an A/D (Analog to Digital) converter 8-1. The A/D converter 8-i converts this signal into an 8-bit digital signal and delivers the latter to a CPU (Central Processing Unit) 10-i through a data BUS 9-i. The CPU 10-i successively writes the received digital signals in a RAM (Random Access Memory) 11. Consequently, signals corresponding to the bill pattern, which signals are hereinafter referred to as the "bill pattern", are stored in the RAM 11-i.

An I-O port 12-i delivers a selection signal to the multiplexer 6-i and also delivers clock signals to the sample hold circuit 7-i and the A/D converter 8-i. At the same time, the I/O port reads the number of the bill discriminating unit 5-i (hereinafter referred to as "module number i") from a module number setting switch 13-i. A ROM (Read Only Memory) 14-i is a memory which stores the program of the CPU 10-i. A BUS buffer controller 15-i conrols the delivery of signals to and from a data BUS 16 and a control BUS 17.

Figure 3:
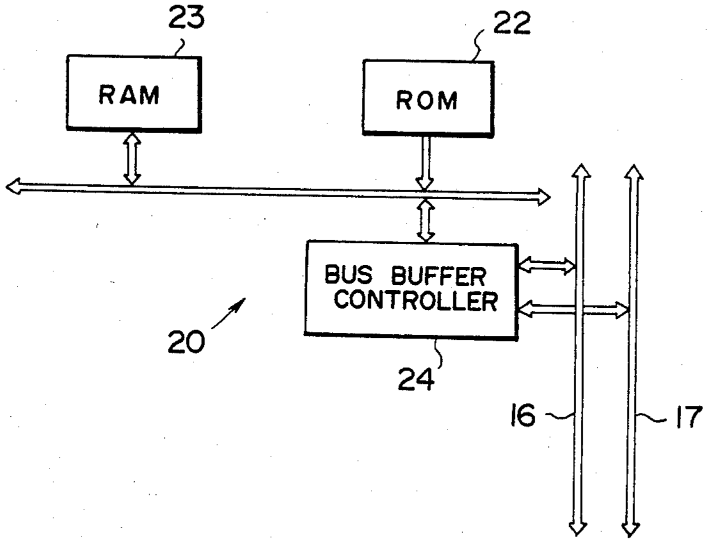
FIG. 3 is a block diagram of a common memory incorporated in the embodiment shown in FIG. 1.
Figure 4:
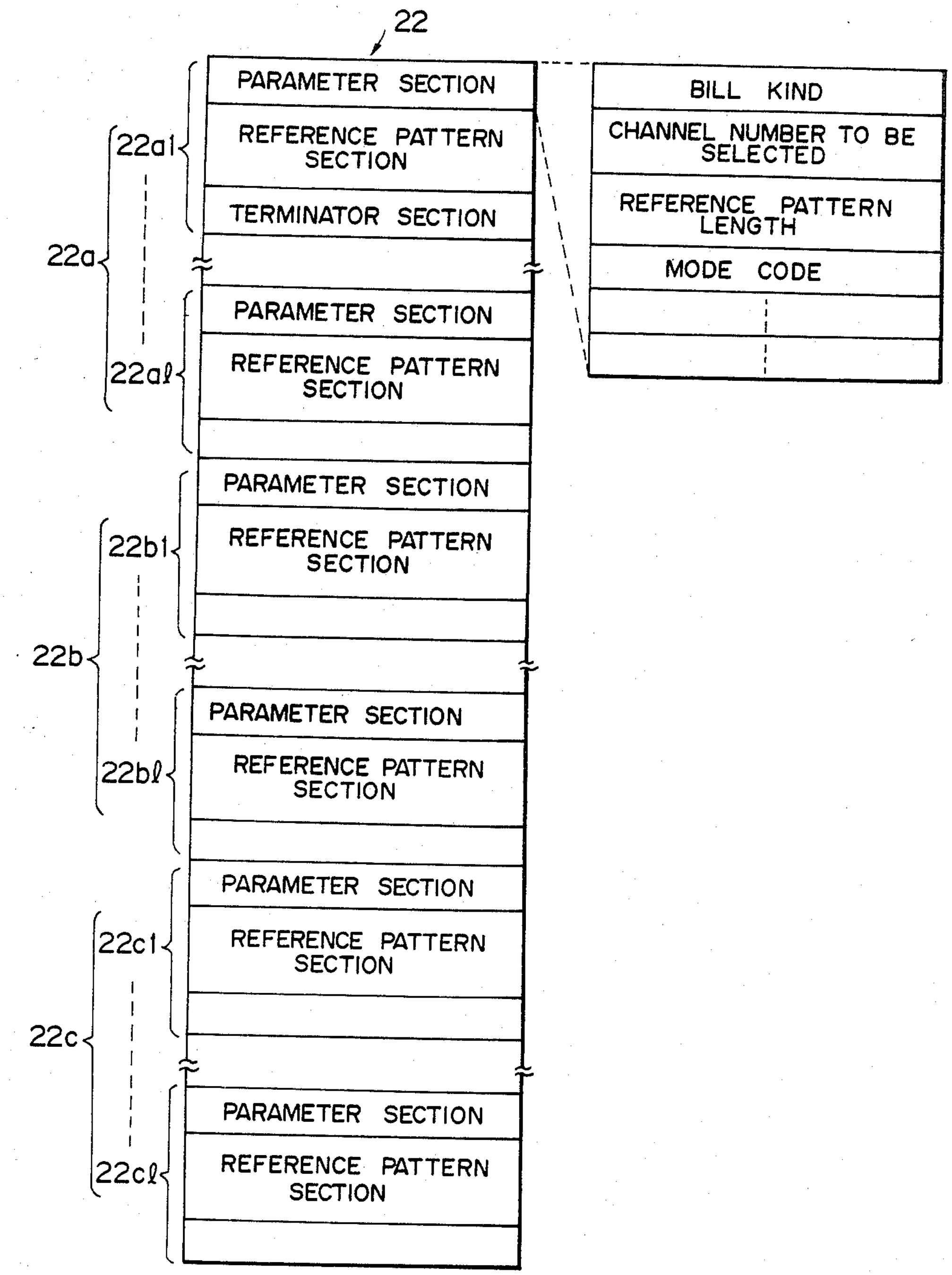
FIG. 4 is an illustration of the state of storage of the reference pattern data in a ROM 22 of the common memory shown in FIG. 3.

Referring back to FIG. 1, a reference numeral 20 designates a common memory which is constituted, as shown in FIG. 3, by a ROM 22, RAM 23 and a BUS buffer controller 24 through which the ROM 22 and the RAM 23 are connected to the data BUS 16 and the control BUS 17. The ROM 22 and the RAM 23 are accessible commonly from the CPU 10-i in the bill discriminating unit 5-i and from a CPU 26 in a control section 25 which will be described later. As shown in FIG. 4, the ROM 22 stores groups of data each including a parameter, reference pattern and terminator, in accordance with the operational mode and kind of bill. (This group of data will be referred to as "reference pattern data, etc.", hereinafter). For instance, the reference pattern data, etc. of 500 bill for use in the bill kind discriminating mode is stored in an area ***22a*1, while an area *22a*2 stores the reference pattern data, etc. of a 1,000 bill, and so on. Thus, the area *22a* is used for the bill kind discriminating mode. Similarly, areas *22b* and *22c* are used for the obverse-reverse discriminating mode and undamaged/damaged discriminating mode, respectively. Each of the areas *22a* to *22c* are adapted to store the reference pattern data, etc. for l kinds of bill. The parameter section stores the bill kind, channel number to be selected by which the channel to be selected by the multiplexer 6**-i is determined, reference pattern length and so forth.

The reference pattern will be briefly explained later. The reference pattern is prepared by dividing the surface of the bill into small grid-like measurement points, converting the analog signals obtained on each measurement point into digital signals and arranging a series of digital signals in the transfer direction of the bill. The number of measurement points perpendicular to the transfer direction of the bill is coincident with the number n of sensors 1 and the pitch of the measurement points in the transfer direction of the bill is determined by the transfer speed, sample hold time and A/D conversion time. The number of the pitches is determined by the length in the transfer direction of the bill. The reference pattern length as one of the abovementioned parameters is determined by the number of the pitches.

Figure 5:
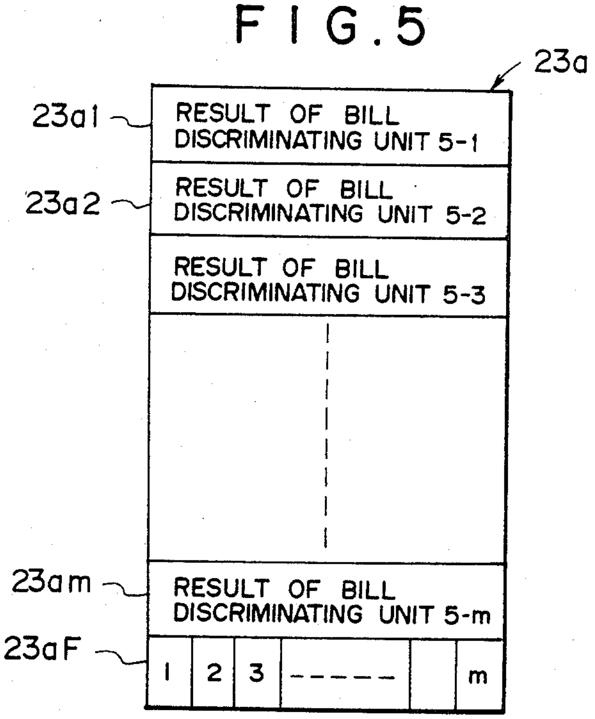
FIG. 5 is an illustration of the construction of a mail box area preserved in a RAM 23 of the common memory shown in FIG. 4.

The RAM 23 has a mail box area 23*a* as shown in FIG. 5. The result of the comparison between the bill pattern and the reference pattern conducted in the bill discrimination unit 5-i is stored in the area 23*ai*. A flag area is designated by 23*a*F, the i th bit of which is set at "1" upon completion of writing in the area 23*a* i is a result of the comparison.

Figure 6:
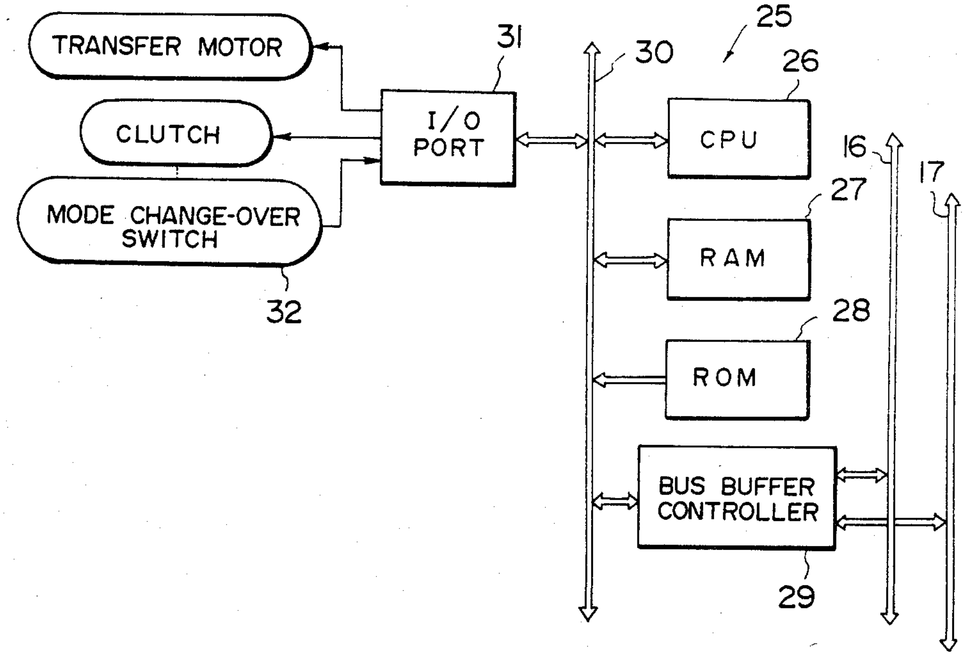
FIG. 6 is a block diagram of a control section 25 in the embodiment shown in FIG. 1.

Referring again to FIG. 1, the control section 25 mentioned before has a CPU 26, RAM 27, ROM 28, BUS buffer control 29, data BUS 30, and I/O port 31, as shown in FIG. 6. The control section 25 is connected through a BUS buffer controller 29 to the data BUS 16 and the control BUS 17. A mode change-over switch 32 is connected to the I/O port 31. The control section 25 conducts the bill discrimination processing in accordance with the result of the comparison made by the bill discriminating unit 5-i written in the mail box area 23*a*-,and conducts the control of portions of the apparatus.

The operation of the above-described embodiment in each operational mode will be described hereinunder. Each bill discriminating unit 5-i is previously set by the module number setting switch 13-i so as to avoid duplication of the module numbers i. The number of the modules connected are large enough to permit satisfactory discrimination processing in all operational modes.

(1) To determine the sum of the amounts of inputted bills in the bill kind discrimination mode As the "bill kind discriminating mode" button of the mode change-over switch 32 is depressed, an initial signal is delivered from the CPU of the control section 25 to the CPU 10-i of each bill discriminating unit 5-i. At the same time, in accordance with the program stored in the ROM 28 of the control section 25, a discrimination alloting signal is delivered to the CPU 10-i of each bill discriminating unit 5-i. The discrimination alloting signal is a signal which instructs, for example, the bill discriminating unit 5–1 having the module number "1" to conduct the discrimination of the 500 bill. This alloting control is made in the order or sequence of the module number i set in respective bill discriminating units 5-i and, hence, there may be a bill discriminating unit 5-i which does not conduct the discrimination processing, depending on the operational mode. The CPU 10-i transfers the reference pattern data, etc. corresponding to the predetermined bill from the area 22*a* of the ROM 22 to each RAM 11-i/ For instance, the CPU 10–1 of the bill discriminating unit 5–1 delivers the reference pattern data, etc. corresponding to the 500 bill from the area 22*a*1 to the RAM 11–1, while the CPU 10–2 of the bill discriminating unit 5–2 delivers the reference patterns data, etc. corresponding to the 1,000 bill from the area 22*a*2 to the RAM 11–2. Similarly, the CPUs 10–3 and 10–4 of the bill discriminating units 5–3 and 5–4 deliver the reference pattern data, etc. corresponding to the 5,000 bill and the 10,000 bill from the areas 22*a*3 and 22*a*4 to the RAMs 11–3 and 11–4, respectively. As the reference pattern data, etc. are set in the RAMs 11-i in the bill discriminating units 5-i, each CPU 10-i reads the "channel numbers to be selected" transferred together with the reference pattern and through the I/O port 12-i instructs the multiplexer 6-i to selects the channels.

After the completion of the initial setting in the manner described above, the operator pushes down the start button. As the bill passes the sensors 1, the signals obtained from the optimum channels selected by the multiplexer 6-i are subjected to the A/D conversion and the thus obtained digital signals form the bill pattern in the RAM 11-i. The function of the parts 6 to 8 is not stated herein in detail because it is materially identical to that of "data collection module" which is commerically available. The bill pattern formed on each RAM 11-i is then compared with the reference pattern written previously in the RAM 11-i during the initial setting, and the results of the comparisons are written in the predetermined mail box areas 23*a* of the RAM 23. By way of example of comparison for discrimination, a comparison is made on each measurement point between the reference pattern data and the bill pattern data to obtain coincidence measurement points in which the differences between the reference pattern data and the bill pattern data remain within the predetermined level. Then, the number of the coincidence measurement points thus obtained is counted. When all of the bits of the flag area 23*a*F have been set at "1", i.e. when the comparisons are completed in all bill discriminating units 5–1 to 5-m, the CPU 26 of the control section 25 compares the results (the number of coincidence measurement points) of the comparisons written in the mail box area 23*a* with preset values in search of a result which exceeds the set value (90% of measurement points). For instance, when the result of the comparison made in the bill discriminating unit 5–1 exceeds the set value, it is judged that the bill is a 500 bill, and this kind of the bill is displayed on the display, not shown, while adding the amount of this bill to the already summed amount of bills. On the other hand, if all of the comparison results fall below the set values, or if more than two of the comparison results exceed the set values, the bill is rejected as being false. Although, in accordance with the example of the above-mentioned discrimination comparison, each bill discriminating unit 5-i writes the number of coincidence measurement points into the mail box area 23*a*i and the CPU 26 of the control section makes comparisons between the number of the coincidence measurement points and the set values to discriminate the kind of the bills, each bill discriminating unit 5-i may make the above-mentioned comparisons to write the results into the mail box area 23*a*i, and the CPU 26 can merely discriminate the kind of the bills. In such a case, it is necessary to transfer data for set values to each bill discriminating unit. Furthermore, although the above-mentioned set values are the number of coincidence measurement values, the set values may be data for ratio to the measurement points. In such a case, it is also necessary to transfer the data for set values to each bill discriminating unit. Furthermore, when there is a bill judging unit 5-i to which the discrimination operation has not been alloted, the bit of the flag area 23*a*F corresponding to this unit is adapted to be always set at "1".

(2) To discriminate whether a bill is inputted with its obverse side directed upwardly or downwardly in the obverse/reverse discriminating mode The operation for obverse/reverse discrimination of a 10,000 bill will be explained by way of example. As the botton "obverse/reverse discriminating mode ( 10,000)" of the mode change-over switch 32 is depressed, initial signals are delivered to the CPU 10-i of each bill discriminating unit 5-i from the CPU 26 of the control section 25. At the same time, discrimination alloting signals are delivered to, for example, the CPUs 10–1 and 10–2 of the bill discriminating units 5–1 and 5–2 in accordance with the program stored in the ROM 28 of the control section 25. Upon receipt of this signal, the CPU 10–1 delivers reference pattern data, etc. corresponding to the obverse side of the 10,000 bill from the predetermined one of the areas 22*b* shown in FIG. 4 to the RAM 11–1, while the CPU 10–2 delivers a reference pattern data, etc. corresponding to the reverse side of the same bill from the predetermined one of the area 22*b* to the RAM 11–2. Subsequently, the CPU 10–1 and the CPU 10–2 read the "channel numbers to be selected" out of each parameter section and deliver the same through the I/O ports 12–1 and 12–2 to the multiplexers 6–1 and 6–2 to instruct the multiplexers to select the optimum channels to be selected.

After completion of the initial setting as abovementioned, a processing the same as that explained in the foregoing item (1) is conducted to discriminate between the obverse and reverse side of the 10,000 bill. It is possible to effect a sorting in accordance with the result of this discrimination.

(3) To discriminate whether the inputted bill is damaged or undamaged in the undamaged/damaged discriminating mode The operation for making undamaged/damaged discrimination will be explained hereinunder with reference to 10,000 bill by way example. As the undamaged/damaged discriminating mode 10,000 bill) of the mode changeover switch 32 is depressed, the CPU 10–1 transfers the reference pattern data, etc. corresponding to the 10,000 bill from the predetermined one of the areas 22*c* shown in FIG. 4 to the RAM 11–1 in the same procedure as explained above. Subsequently, the CPU 10–1 reads the "channel numbers to be selected" from the parameter section to instruct through the I/O port 12–1 that the multiplexer 6–1 selects the optimum channels. After the initial setting is made as mentioned above, the same processing as the foregoing item (1) is conducted to discriminate whether the inputted 10,000 bill is damaged or undamaged.

For varying the level or condition of the undamaged/damaged discrimination in this operational mode, a plurality of reference patterns are prepared for respective discrimination conditions or, alternatively, on making a comparison between the number of coincidence measurement points and the set values in the CPU 26 of the central section 25, the discriminating level is changed. Namely, if the set values are made to be low, the security of discrimination becomes low and vice versa. The number of the checking points of the bill can be increased by increasing the number of the sensors and, if necessary, increasing the number of the bill discriminating units 5-i correspondingly. It is possible to effect a sorting in accordance with the result of this discrimination.

(4) To reject different types of bill in different bill discriminating mode (To select only a specific type of bill from a group of different bills)

This operation is conducted substantially in the same manner as the item (3) above, so that the detailed description of this operation is omitted. It is to be noted here that, as in the case of the operation stated in the item (3) above, the discrimination in this operation can be conducted by a single bill discriminating unit.

In the described embodiment, the module number i is set by the module setting switch 13-i. This, however, is not the only possible arrangement and the setting can be made by changing the position (connector) to which the printed circuit board mounting the bill discriminating unit is inserted. It is also possible to integrate the bill discriminating units in one chip and even to make each bill discriminating unit include all reference patterns. It is also possible to store the reference pattern data in the RAM instead of the ROM so that the reference pattern data can be rewritten as desired. If the amount of processing time available is sufficient, it is possible to arrange such that each bill discriminating unit conducts the discrimination of two or more bill patterns, e.g. the transparent pattern, reflection pattern, magnetic pattern and color pattern, or processing of two or more kinds of bill for each of these patterns. Therefore, reflective optical sensors, color sensors and magnetic sensors, as well as the transparent optical sensors, can be used as the sensors 1.

As has been described, the invention provides a bill discriminating method which utilizes a common memory storing respective reference patterns and the bill discriminating units having RAMs and channel selecting means such that any desired reference pattern is written in the RAM and that any desired optimum channels are selected by the channel selecting means. The method of the invention, therefore, makes it possible to conduct various modes of discriminating operations such as discrimination of the kind of bills, discrimination as to whether the obverse or reverse side is directed upward, discrimination as to whether the bill is undamaged or damaged and discrimination for rejecting different kinds of bill, by bill discrimination units of an identical construction. In addition, the coast can be reduced advantageously because only one bill discriminating unit is required as a spare for maintenance. Furthermore, it is possible to cope with the demand for discrimination of newly issued bill or foreign bills simply by changing the reference pattern. In addition, it is possible to change the level or condition of discrimination in each operational mode in accordance with any change in the level of the undamaged/damaged discrimination or change in the quantity of light receivable by the sensors, simply by varying the reference pattern. If it is desired to increase the number of kinds of the bill to be discriminated in the bill kind discriminating mode or to combine the operational mode, e.g. to conduct the obverse/reverse discrimination while discriminating the bill kind to take out only the correct bill, such a demand can be met merely by increasing the number of the bill discriminating units and the number of the reference pattern, advantageously.

What is claimed is:

1. In a bill discriminating method in which a bill pattern is extracted in accordance with signals derived from selected optimum channels out of a plurality of channels connected to sensors disposed in the path across which a bill moves, and the bill is discriminated through comparing said bill pattern with a reference pattern set up previously in accordance with discriminating operation modes and the kinds of bills, an improvement which comprises utilizing: a mode change-over switch for selecting and appointing one of said discriminating operation modes, bill discriminating units each having an internal memory and a channel selecting means, and a common memory accessible commonly from said bill discriminating units and adapted to store reference patterns and the channel numbers of the channels to be selected; and taking the following steps:

(a) a first step in which each of said bill discriminating units reads, out of said common memory, the selected and appointed discriminating operation mode, the kind of bill and it corresponding reference pattern, and the channel numbers of the channels to be selected, and writes the same in its internal memory;

(b) a second step in which each bill discriminating unit selects the channels in accordance with the channel numbers written in the internal memory thereof and extracts the bill pattern in accordance with the signals derived through respective channels;

(c) a third step in which each bill discriminating unit compares said bill pattern extracted in the second step (b) with the reference pattern written in said internal memory thereof; and (d) a fourth step in which the bill is discriminated in accordance with the result of the comparison made in each bill discriminating unit.

* * * * *